United States Patent
Ruch et al.

(10) Patent No.: US 12,055,921 B2
(45) Date of Patent: Aug. 6, 2024

(54) QUALITY CONTROL BASED ON MEASUREMENTS FROM VERIFIED SENSORS

(71) Applicant: International Business Machines Corporation, Armonk, NY (US)

(72) Inventors: Patrick Ruch, Pratval (CH); Erich M. Ruetsche, Pfaeffikon (CH); Gero Dittmann, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 16/808,713

(22) Filed: Mar. 4, 2020

(65) Prior Publication Data

US 2021/0278826 A1    Sep. 9, 2021

(51) Int. Cl.
  *G05B 19/418* (2006.01)
  *G06F 16/182* (2019.01)
  *H04L 9/32* (2006.01)

(52) U.S. Cl.
  CPC ... *G05B 19/41875* (2013.01); *G05B 19/4183* (2013.01); *G06F 16/1837* (2019.01); *H04L 9/3247* (2013.01)

(58) Field of Classification Search
  None
  See application file for complete search history.

(56) References Cited

U.S. PATENT DOCUMENTS

| | | | |
|---|---|---|---|
| 7,127,439 B2 * | 10/2006 | Jannarone | G06N 20/00 706/23 |
| 10,140,253 B2 | 11/2018 | Blevins et al. | |
| 10,193,695 B1 | 1/2019 | Endress et al. | |
| 11,184,766 B1 * | 11/2021 | Lord | G06V 10/75 |
| 2011/0307217 A1 * | 12/2011 | Fritz | G01D 21/00 702/183 |
| 2012/0296605 A1 * | 11/2012 | Hamzaoui | H04Q 9/00 702/184 |
| 2013/0012822 A1 * | 1/2013 | Kosturko | A61B 5/1455 600/476 |

(Continued)

FOREIGN PATENT DOCUMENTS

CN    109711705 A    5/2019

OTHER PUBLICATIONS

Unknown, "Milk testing and Quality Control", Milk Processing Guide Series, vol. 2, Section 2.4.5.8, Published by: FAO/TCP/KEN/6611 Project, printed Jan. 9, 2020, 12 pages.

(Continued)

*Primary Examiner* — Jeffrey C Pwu
*Assistant Examiner* — Mayasa A. Shaawat
(74) *Attorney, Agent, or Firm* — Jeffrey Ingalls (57) ABSTRACT

Embodiments are disclosed for a quality control method. The method includes verifying one or more sensors as part of a verification process and assessing a quality of an item or a technical process as part of a quality control process. Two or more measurements values characterizing the item or the technical process from the one or more sensors are obtained. One or more output values based on a computerized process taking the two or more measurements values as inputs are obtained. At least one of the output values obtained is compared to one or more corresponding reference values, to obtain a quality assessment of the item or the technical process.

20 Claims, 7 Drawing Sheets

(56) References Cited

U.S. PATENT DOCUMENTS

| | | | | |
|---|---|---|---|---|
| 2014/0022093 | A1* | 1/2014 | Hubauer | G05B 19/4183 |
| | | | | 340/870.02 |
| 2018/0164209 | A1 | 6/2018 | Stiens et al. | |
| 2018/0205543 | A1* | 7/2018 | Fradet | H04L 9/3234 |
| 2019/0068461 | A1* | 2/2019 | Barkie | H04L 67/125 |
| 2020/0174463 | A1* | 6/2020 | Cella | G05B 23/0229 |
| 2020/0250285 | A1* | 8/2020 | Reedy | G06F 21/32 |
| 2021/0046489 | A1* | 2/2021 | James | B04B 5/0442 |

OTHER PUBLICATIONS

Vlasov et al., "Nonspecific Sensor Arrays ("Electronic Tongue") for Chemical Analysis of Liquids", Pure Appl. Chem., vol. 77, No. 11, pp. 1965-1983, 2005.
Winquist et al., "An electronic tongue based on voltammetry", Analytica Chimica Acta 357 (1997), pp. 21-31.
Wikipedia, "Principal component analysis", Dimensionality reduction, last edited on Dec. 18, 2019, printed Jan. 9, 2020, 30 pages.
Mell et al., "The NIST Definition of Cloud Computing", Recommendations of the National Institute of Standards and Technology, Sep. 2011, 7 pages.
Balagurusamy, V.S.K. et al., "Crypto anchors", Feb. 20, 2019, IBM Journal of Research and Development, vol. 63, No. 2/3, pp. 4:1-4:12, Mar.-May 2019, 12 pages, <https://doi.org/10.1147/JRD.2019.2900651>.

* cited by examiner

QUALITY CONTROL BASED ON MEASUREMENTS FROM VERIFIED SENSORS

BACKGROUND

The invention relates in general to the fields of quality control methods and computerized systems to perform such methods.

Conventional quality control (QC) can rely on human-readable, threshold-based, acceptance criteria. A drawback of such methods is that malicious actors can identify such acceptance criteria and trick the QC process by specifically targeting thresholds used by the process.

For example, a malicious actor can add water to milk to increase profits. The density of the adulterated milk is abnormal, which can be detected with a lactometer test. But the density of adulterated milk can possibly be adjusted by adding sugar or salt, a thing that cannot be detected solely with the lactometer test. Further, it may be useful to involve an expert analysis to characterize the adulterated, adjusted milk. However, such expert analysis may be costly or impractical.

SUMMARY

According to a first aspect, the present invention is embodied as a computer-implemented, quality control method. The method comprises verifying one or more sensors as part of a verification process and assessing a quality of an item or a technical process as part of a quality control process. This is achieved by obtaining two or more measurements values characterizing said item or said technical process from said one or more sensors. Next, one or more output values are obtained based on a computerized process that takes said two or more measurements values as inputs. Finally, the method compares at least one of the output values obtained to one or more corresponding reference values, so as to obtain a quality assessment of said item or said technical process.

According to another aspect, the invention is embodied as a computerized system. The latter comprises interface to connect to one or more sensors, so as to be in data communication therewith. The system further includes storage storing instructions, as well as processing, which are configured to execute said instructions, so as to cause to verify said one or more sensors as part of a verification process and assess a quality of an item or a technical process as part of a quality control process. Consistent with the above method, this is achieved by: obtaining two or more measurements values characterizing said item or said technical process from said one or more sensors; obtaining one or more output values based on a computerized process taking said two or more measurements values as inputs; and comparing at least one of the output values obtained to one or more corresponding reference values, so as to obtain a quality assessment of said item or said technical process.

According to a final aspect, the invention is embodied as a computer program product for performing quality control. The product comprises a computer readable storage medium having program instructions embodied therewith, wherein the program instructions are executable by one or more processors of a computerized system to cause the latter to take steps according to the above method.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Conventional process control (PC) can rely on human-readable sets of parameters (often based on time series) and/or conventional proportional-integral-derivative (PID) controllers. An example of PC concerns bioreactors used for the production of functional molecules or cell lines for therapeutics. However, malicious actors can, for instance, steal sensitive process recipes to reproduce the process or divulge PC information to non-authorized entities. There is accordingly a need to improve quality control methods.

Figure 1:
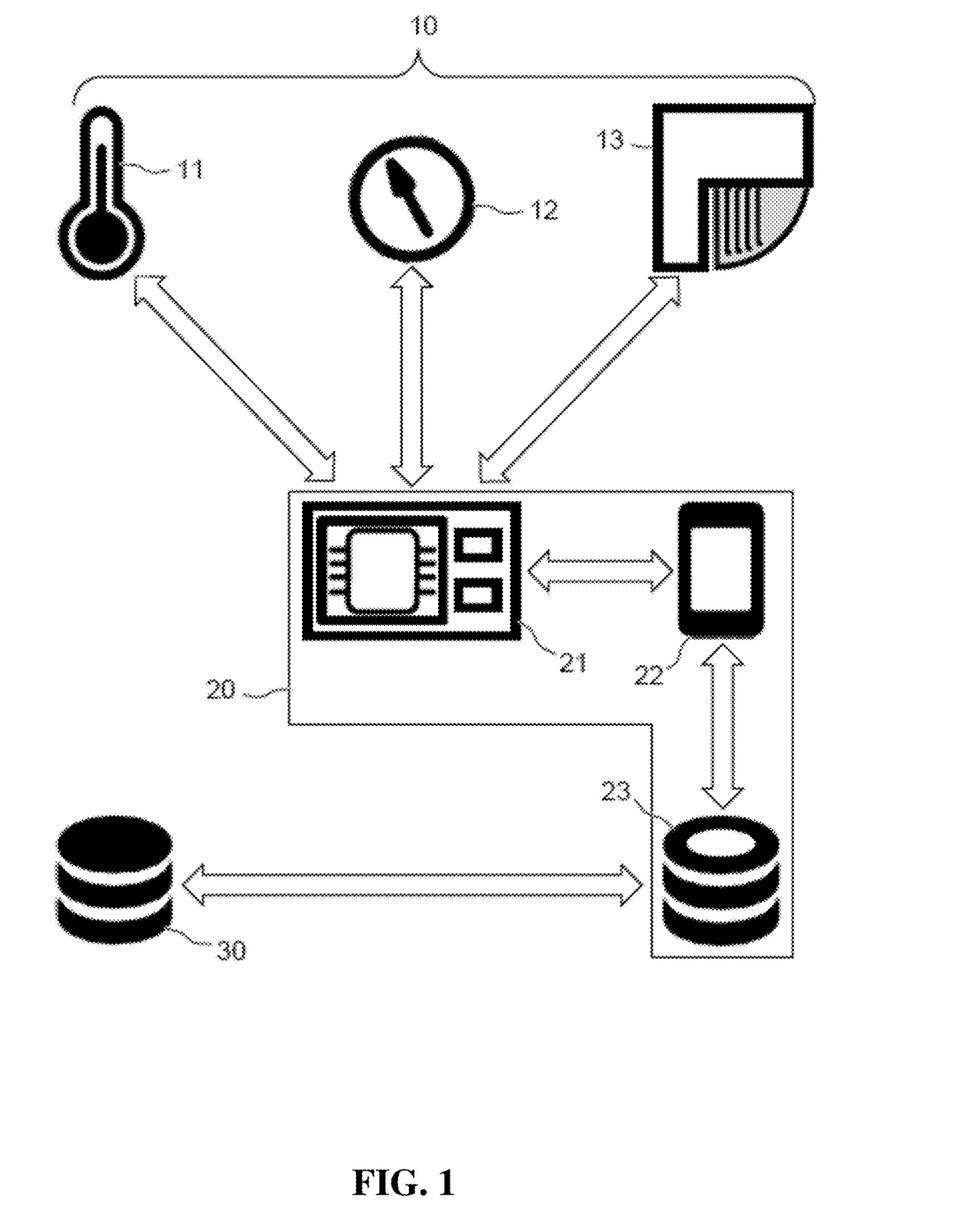
FIG. 1 is a block diagram of a computerized system, in accordance with some embodiments of the present disclosure.

An aspect of the present disclosure is first described, which concerns a computer-implemented, quality control method. Note, this method and its variants are collectively referred to as the "present methods" in this document. The present methods can typically be performed by entities such as depicted in FIG. 1. In the example of FIG. 1, such entities include a computerized system 20, which comprises a micro-controller 21 connected to a smartphone 22, which can connect to a back-end server 23, as well as sensors 11-13 (collectively referred to as one or more sensors 10), which can be connected to the micro-controller 21, and one or more databases 30, which can be queried by the back-end server 23. Such entities are denoted by numeral references in the accompanying drawings, whereas references "Sij" shown in the flowcharts of FIGS. 2-4 refer to method steps.

Figure 2:
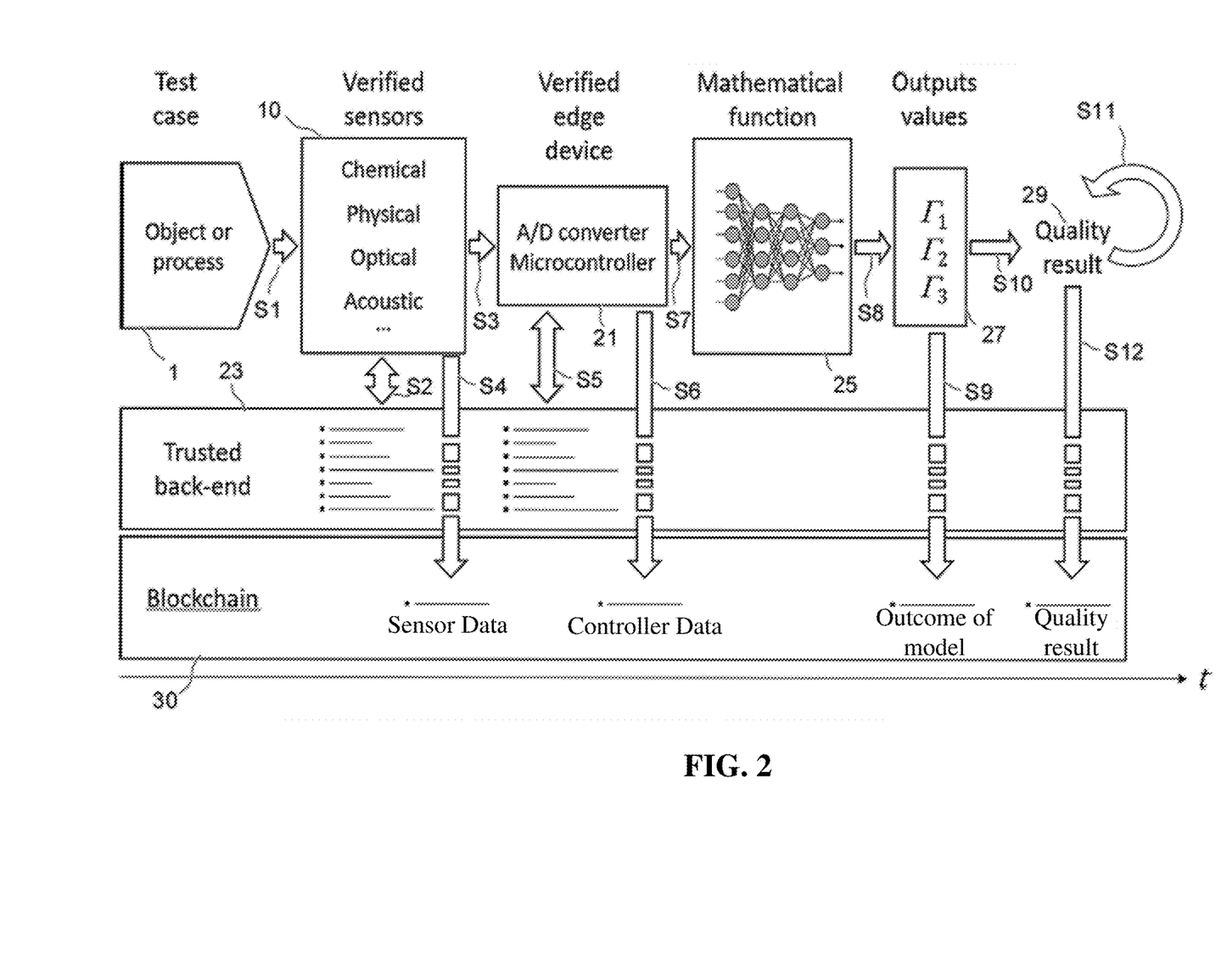
FIG. 2 is a flowchart of a method of verifying sensors and assessing a quality of an item or a technical process, in accordance with some embodiments of the present disclosure.

In reference to FIG. 2, at step S1, an object or process 1 can be provided as input to sensors 10. Additionally, the present methods can include the steps of: (i) verifying S2 one or more sensors 10, as part of a verification process, and (ii) assessing a quality of an item 1 or a technical process 1, as part of a quality control (QC) process. Note, an item can be any object, product, manufactured article or goods, for which QC is desired. A technical process can be any industrial or scientific process (i.e., a method), which can for example involve devices, or any type of equipment, materials (fluids, solids, etc.), signals, light, or other forms of energy, that is, things that can be probed, at least partly, using said sensors. Quality control can similarly be desired in respect of such a technical process, which may be referred to as process control.

In order to perform the QC, two or more measurements values are obtained S3, S7 from the one or more sensors 10. Such values are assumed to characterize this item or process, at least to some extent. Note, such measurements values can also be used to verify the sensors, in addition to assess the quality of the item 1 or the technical process 1, as discussed later in reference to embodiments shown in FIGS. 3 and 4.

Additionally, one or more output values 27 are obtained S8, S10, based on a computerized process 25. This process 25 takes the measurements values as inputs. This process 25 can, for instance, amount to running an algorithm, e.g., for evaluating a mathematical function. The process 25 is discussed later in detail. A benefit of this process 25 is to produce values that can be decoupled from the measurement values produced by the sensors.

Finally, the present methods compare S11 at least one of the output values 27 obtained S8, S10 to one or more corresponding reference values. This makes it possible to eventually obtain S12 a quality assessment of the item or technical process of interest. The results of the sensor verification and the quality assessment can be stored on some storage device, as discussed later in detail.

The present methods involve steps executed by way of computerized instructions. The latter can, for instance, be executed in a given computerized entity 21, 22, 23, or jointly at two or more of said entities (see FIG. 1 or 2). That is, such instructions can form part of software components that are jointly executed at two or more of the computerized entities 21, 22, 23 of the system. Such entities 21-23 form part of a computerized system 20 that is later described in detail in reference to another aspect of the present disclosure.

Such instructions can, for instance, cause said entities 21, 22, 23 to compute the output values 27 based on the measurement values obtained from the sensors 10 and connect to one or more databases for verification and comparison purposes. Note, the system 20 can be configured in a way that such instructions cause to locally compute the output values, e.g., at an entity 21, 22 close to the sensors. In some embodiments, running said instructions triggers a remote computation of the output values, e.g., by the entity 23 (e.g., a back-end system, as assumed in the following) or a further entity. Thus, depending on the chosen implementation, the computing capabilities of the entities 21-23, and the complexity of the process 25, the output values can possibly be computed at an entity 21, 22 close to the sensors, or at the back-end server 23, or even outsourced to another computerized entity (not shown).

Such instructions may notably form complementary software components that include a local software component (e.g., running at the entity 21 and/or 22) and one or more non-local software components (e.g., running at the server 23 or another entity). For example, the local software component can be designed to access data from the sensors 10 and perform some computation to obtain the output values 27, according to the computerized process 25. The local software component can for example be run on an edge or peripheral device (e.g., the microcontroller 21 or the smartphone 22) that communicate with one or more remote entities 23, 30, as assumed in FIG. 1.

Figure 3:
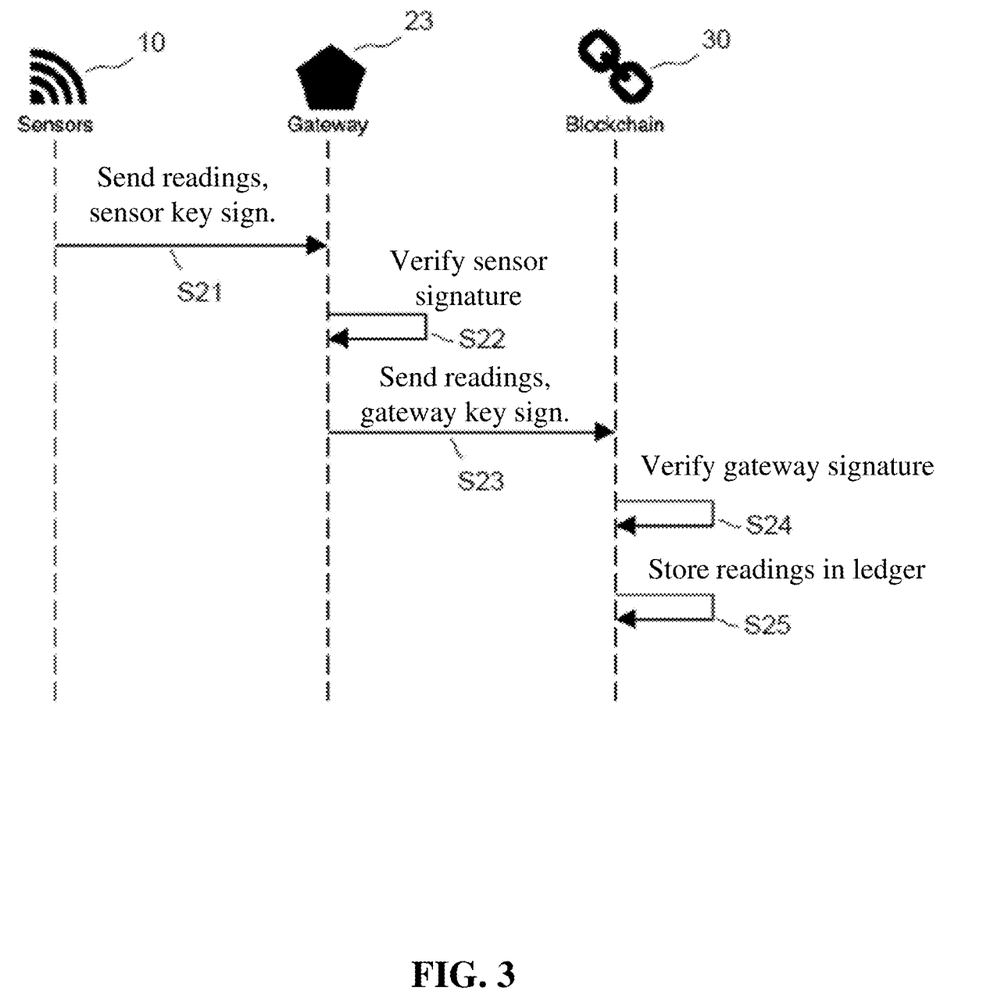
FIG. 3 is a message flow diagram a protocol to verify sensors and store readings from the sensors in a blockchain, in accordance with some embodiments of the present disclosure.
Figure 4:
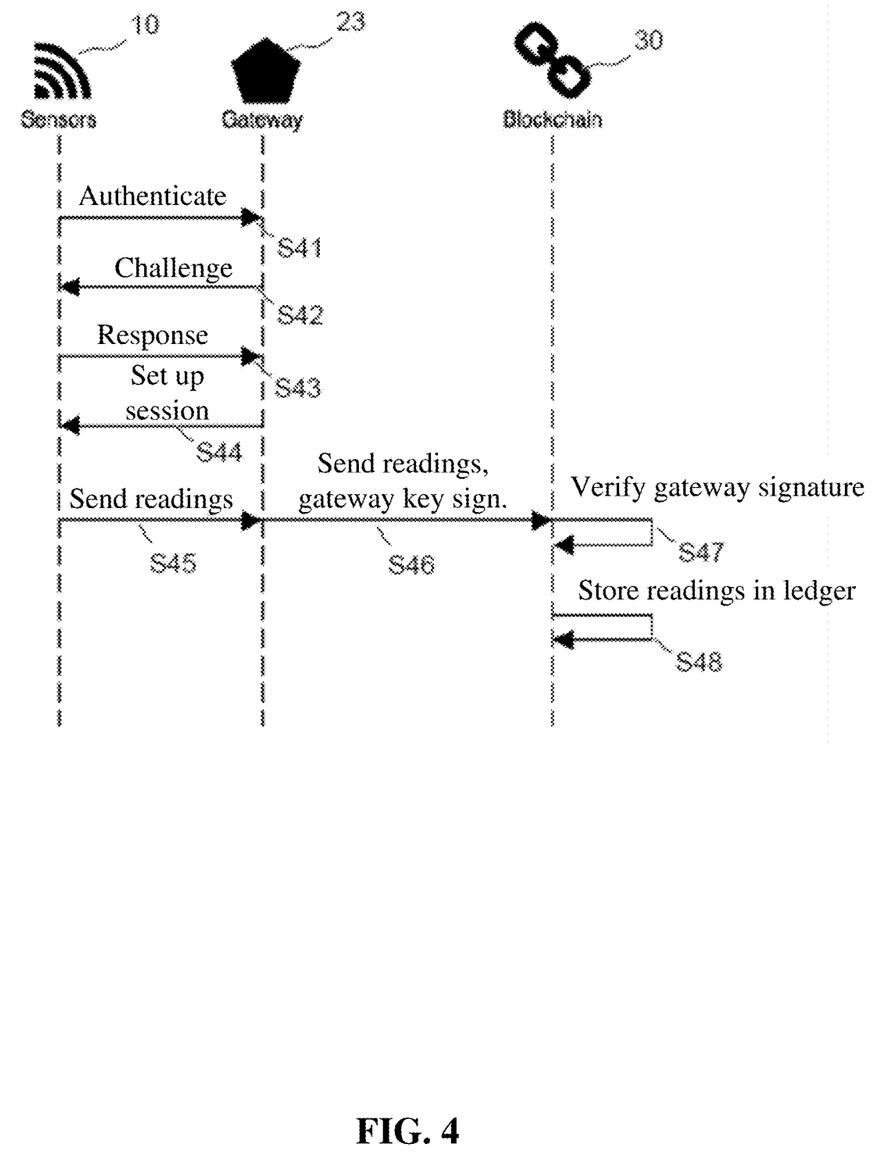
FIG. 4 is a message flow diagram of a protocol to authenticate the sensors and store readings from the sensors in a blockchain, in accordance with some embodiments of the present disclosure.

The non-local components can, for instance, be run at the back-end server 23 (e.g., a trusted backend), or at a gateway thereof, as assumed in FIGS. 2-4. Additional non-local software components can further be run at a further system 30, e.g., supporting one or more databases, as assumed in FIG. 4. The non-local software components can cause a computerized entity 22, 23 to interact with said databases 30 for verification and comparison purposes, for example. In some embodiments, the process 25 can be executed at the back-end server 23. In all cases, the local and non-local software components are jointly run for the purpose of performing steps according to the present methods. Beyond the examples above, it will be apparent to the one skilled in the art that many software architectures are possible, which notably depend on the computing capabilities of the various computerized entities 21-23, 30 involved.

Note, a single database 30 is assumed in the example of FIGS. 1 and 2. In some embodiments, distinct databases can be used. In that case, said instructions may notably cause to query a first database for verification purposes and query a second database for the QC assessment, for example. In some embodiments, one or each of the databases can be implemented at the server 23. Preferred, however, is to rely on a trusted back-end server 23 that is physically distinct from (but interacts with) the external system(s) 30 supporting the database(s).

One or each of said external system(s) 30 can possibly be a distributed storage system, configured as a shared ledger, relying on digital ledger technology. The external system(s) may notably be configured as blockchain(s), and more as business blockchain(s), such as the Hyperledger Fabric, or a similar blockchain that relies on a consensus algorithm that is less compute-intensive than the Proof-of-Work variant.

Various embodiments can be contemplated. In some embodiments, the entity 23 is a trusted backend and the database(s) are configured, each, as a shared ledger. Because the entity 23 is a trusted backend, it is trusted that operations it performs cannot be forged. And since each of the database(s) is a shared ledger, the transactions recorded in the ledger cannot be forged either. In some embodiments, each entity 23, 30 is implemented as a shared ledger, e.g., a blockchain whose integrity is ensured by smart contracts and other security mechanisms characteristic of a blockchain. More generally, each entity 23, 30 can either be a database controlled and protected by a trusted entity and, therefore, trusted, or a shared ledger. In some embodiments, the two entities 23, 30 can be combined in a single system.

A blockchain is an attractive platform in the present context as it is distributed, immutable, can be highly available and can, if suitably set up, be independent of object manufacturers, vendors, QC entities, etc. In some embodiments, one or more central databases can be used in place of shared ledgers. However, a central database might be subject to attacks and a single point of failure, not least if the database owner goes out of business. Thus, transactions relating to the present QC steps can, for instance, be stored on one or more blockchains, where distribution and consensus algorithms improve the robustness against failure and fraud.

The verification step may notably be carried out based on unique identifiers (UIDs) of the sensors, by comparing such UIDs to reference UIDs as stored on the trusted backend system 23 or queried from the latter, or by verifying signatures used on signing data obtained from the sensors 10 (as assumed in FIGS. 3 and 4). If needed, the sensors can be authenticated (as in FIG. 4) by the trusted backend system 23.

In some embodiments, digital fingerprints (DFPs) are used to verify the sensors. For example, physical fingerprints can possibly be attached to the sensors, in which case DFPs can be derived from the physical fingerprints, e.g., using a smartphone 22 or any suitable reader, in order to verify the sensors. The DFP accordingly obtained is thus impacted by a unique physical property of a sensor (as captured by said physical fingerprint), which makes it possible to achieve a tight link between the sensor and its digital representation. A DFP is typically a number, a string, or any combination of characters (possibly including digits and other characters), or, more generally, a dataset that reflects said unique property.

In embodiments, the physical fingerprint is determined by a physical anchor, designed so as to exhibit a unique physical property. In that case, the DFP obtained is impacted by the unique physical property of the physical anchor of the sensor. The physical anchor can be unalterably affixed to (entangled with) the sensor, e.g., with a strong adhesive or in a way that irrevocably alters the exploited property, the sensor itself, or a main functionality thereof, when removed, destroyed, or otherwise altered. The physical anchor can also be integrated, in an inalterable way, in a body of the object. Anchors can for example include embedded security features (e.g., microprinting, security ink, or hologram), and/or physical fingerprints (e.g., a physical unclonable function).

In general, the verification processes involved herein go beyond a mere identification process, whereby a given entity would merely declare its identity, i.e., identify itself by communicating its identifier. Here, the verification process verifies the identity of a given sensor, e.g., by comparing a communicated identifier (e.g., a UID) against already stored UIDs (e.g., as previously communicated during an enrollment procedure). That is, an identification process can be regarded as a sub-process of the present verification step. Still, while the present verification can involve or be complemented by some authentication process (e.g., based on a challenge-response or on the verification of multiple factors), it does not necessarily involve a strong authentication. Note, the verifications S2, S5 performed herein do not necessarily act as authorization mechanisms. That is, the comparison S11 can be performed irrespective of outcomes of such verification steps, whereby the results obtained from the comparison S11 with the reference values can be logged S12 in an external database 30 for tracking purposes, even if the verification of the sensors 10 (or of the processor 21) fails, in order to be able to track malicious attempts to obtain QC certificates, for example.

The steps of the present methods may not be decoupled nor executed in the apparent order of the steps described above or in the appended claims. For example, the verification process S2 may not be performed prior to verifying the sensors 10 but can be executed as part of or upon obtaining the measurements values from the sensors 10. E.g., said measurement values can be cryptographically signed (e.g., by the sensors 10, an edge or peripheral device 21, 22, and/or the backend 23), and the signature(s) can subsequently be verified by a remote entity 23, 30, in order to verify S2 the genuineness of the sensors 10, as assumed in FIGS. 3 and 4.

The computerized process 25 used to obtain the output values should be understood in a broad sense. It can for example encompass the execution of an algorithm or some low-level instructions with a computer or some processor, or the evaluation of an analytical or numerical function (i.e., a mathematical function), for example.

This process 25, or the mathematical function it captures, does not linearly depend on the measurement values it takes as input (or as arguments). In some embodiments, simpler schemes can yet involve a linear combination of several arguments corresponding to several of said measurement values, for example. However, more elaborate schemes are possible, e.g., which rely on a feature extraction algorithm or a principal component analysis. Such schemes make it much harder for a malicious actor to tamper with the QC criteria. Importantly, this process 25 takes into account multiple measurement values as input (or arguments).

The measurement values can possibly be obtained from a single sensor, even when this sensor has a single sensing function. There, several measurements corresponding to different measurement times (e.g., shifted by constant time intervals) can be taken into account. In some embodiments, several measurements can be obtained from several sensors or a multi-function sensor, which can correspond to distinct properties of the item or technical process of interest. In all cases, the fact that multiple measurement values are taken into account makes it harder to fake the properties of the genuine item that are subject to the QC process.

Another aspect that improves the ability of the QC process to recognize non-authentic items is the fact that even knowledge of the reference values used in the comparison S12 is insufficient for a malicious actor to trick the QC process by submitting a counterfeit item. This is because the process 25 decouples the output values 27 used for comparison S12 from the measurement values S3, S7, so that, for all practical purposes, the malicious actor cannot reconstruct those properties of the item under test for it to be recognized as a genuine item. Note, the process 25 can further involve a one-way function. Now, even if a malicious actor happens to know that function, s/he will not be able to easily reconstruct the measurement values to trick the QC process.

Outcomes of the verification processes and/or the QC process can be logged S4, S6, S9, S12 in an external database 30, e.g., in a distributed ledger, as in embodiments discussed below.

The present solution addresses situations where the authenticity or genuineness of items such as physical goods need be verified, for purposes of quality control or QC-based detection of counterfeited goods. This solution similarly applies to the verification of a correct operation of a process, i.e., for process control (PC) purposes. This solution provides a secure method of verification applicable to both situations. Embodiments as disclosed herein make it even impossible, for all practical purposes, for a malicious actor to trick the verification or authentication process.

All this is now described in detail, in reference to particular embodiments of the present disclosure. To start with, said output values 27 may, in embodiments, be obtained S7 via given processor, e.g., of an edge device 21 (such as a micro-controller) or a smartphone 22. That is, such processor 21 can execute the computerized process 25 to provide said output values 27. In such cases, the trusted back-end 23, for instance, may be instructed to verify S5 said given processor 21, in addition to the sensors 10. In some embodiments, the processor 21 forms part of a microcontroller 21 that can be paired with the sensors, e.g., wirelessly or via A/D converters, as assumed in FIG. 2. Now, since the processor 21 used to obtain such output values 27 can possibly be tampered with, increased security will be achieved by verifying S5 such processor 21 (or the device including it), beyond the sole sensors 10.

As noted earlier, the verification steps S2, S5 typically require connection to a computerized entity 23, e.g., a server. That is, the local processor 21, or a smartphone 22, can connect S2, S5 to this entity 23 for it to verify the sensors and/or the processor 21, based on attributes thereof. In practice, this connection can, for example, be initiated prior to or upon instructing to verify S2, S5 the sensors 10 and the processor 21. As said, the computerized entity 23 can be a trusted back-end server, e.g., controlled by a trusted authority, as assumed in FIG. 2.

Various types of attributes can be used for verification purposes. For example, the verification can be based on UIDs, media access control (MAC) addresses (i.e., unique identifiers assigned to network interface controllers of the devices), public keys, certificates, etc. The verification steps can also be based on signatures as used by (or for) the sensors 10 to sign measurement data produced by the sensors, as assumed in FIGS. 3 and 4. An authentication process can further be involved, as illustrated in FIG. 4; this authentication typically makes use of attributes of the devices 10, 21. If the sensors 10 cannot communicate with the authenticating entity 23, then the authentication can be performed via an intermediate device, such as an edge device 21, a smartphone 22, or another peripheral device.

Such attributes can for example be communicated during an initial enrollment procedure. For example, FIG. 1 depicts a situation where a smartphone 22 can be used to enroll the sensors 10, by communicating attributes of the sensors to the entity 23. Beyond the sole sensors 10, the smartphone 22 can also be used to enroll the processor 21 (or equivalently the edge device 21 including such processor) at the entity 23, in order to allow subsequent verifications S2, S5 by the entity 23. Again, one can use attributes of the processor 21, such as a UID, a MAC address, an associated public key or certificate, etc. This way, the enrolled devices 10, 21 can be verified by the entity 23 by comparing the communicated attributes to reference attributes as communicated during the enrollment procedure. The verification process S2, S5 typically requires communicating (e.g., from the smartphone 22) UIDs of the devices 10, 21 to the entity 23 for it to be able to compare the communicated UIDs to reference UIDs as stored thereon or otherwise available, e.g., online.

Note, in some embodiments, the genuineness of such devices can be verified a posteriori, after having initiated a QC process, e.g., by obtaining certificates on-the-fly, for example. In other embodiments, the devices 10, 21 involved can be verified S2, S5 by querying a database 30 maintaining attributes of such devices, e.g., based on data provided by resellers of such devices or based on external ownership tracking databases. In such cases, it is not necessary to enroll the devices with the server 23. Enrollment may, however, be performed with other computerized entities.

FIG. 3 assumes that the sensors 10 were enrolled with the server 23 by communicating public keys and/or certificates (as associated to the sensors 10) to the server 23. Note, any public key infrastructure (PKI) can be relied on. This way, datasets capturing readings (i.e., signals) obtained from the sensors can be signed (typically be the same entity as used to enroll the sensors, e.g., the smartphone 22) and transmitted S21 to the server 23. The signature is typically performed using private keys corresponding to such sensors. A single private key can possibly be used in respect of two or more of the sensors 10, or the whole setup 10, 21. A subsequent signature verification can be made S22 at the server 23 based on the corresponding public keys and/or certificates (from which the relevant public keys are derived).

In each of the embodiments of FIGS. 3 and 4, the verifications of the sensors 10 requires communicating S21, S46 signed versions of the measurements values obtained from the sensors 10. The signed versions of such values have been obtained by signing the sensors' data using one or more private keys. In FIG. 3, the sensors' data are signed prior to being passed to the server 23, for the latter to verify S22 the signature. In FIG. 4, the server 23 authenticates S41-43 the sensors, prior to set up S44 a data communication session, in order to receive the sensors' data. Again, depending on the capabilities of the sensors 10, this session can be set up with a smartphone 22 connected to the sensors or to an edge device 21. The server 23 can thus receive S45 the sensors' data and sign them using its own private key. Next, an automated process (e.g., a smart contract) executing on the database 30 (e.g., a blockchain) verifies S47 the signed values transmitted S46 from the server 23, based on the public key of the server 23 (or a public key derived from a certificate), assuming that the server 23 has previously enrolled with the database 30. Once verified, the sensor readings can be stored S48 on the database 30. Note, FIGS. 3 and 4 are assumed to involve a gateway 23, which can, for instance, form part of a trusted back-end server 23, as evoked earlier.

The protocols shown in FIGS. 3 and 4 can be extended to the edge device 21 too, i.e., to the processor used to produce the output values 27. For instance, each of the sensors and the processor 21 can interact S2, S5 with the server 23 in order to be verified and/or authenticated by the server, based on attributes thereof. Again, this authentication process can involve a smartphone 22. The authentication can for example be based on multiple factors, as known per se, exploiting data stored during previous enrollment procedures. In some embodiments, the processor 21 can be authenticated, while the signed values obtained from the sensors 10 can be used for both verifying the sensors and for obtaining the desired quality assessment.

The comparison S11 for the quality assessment can possibly be performed by querying the server 23 based on output values 27 produced by a peripheral entity 21, 22, for the server 23 to compare such output values 27 with corresponding reference values. The server 23 then produce (and possibly returns) a value indicative of the quality assessment. Both the output values 27 and the outcome of the comparison can possibly be stored S9, S12 on the database 30. Note, as evoked earlier, two databases can possibly be used by the server 23, one for verification purposes, the other one for comparison purposes. As said, the two databases may notably be supported by a same physical system 30 or accessible by that same physical system 30. In some embodiments, however, said databases can be supported by distinct physical systems. The computerized entity 23 can thus query one or two external databases, which may be implemented as blockchains, for reasons mentioned earlier.

More generally, one or more external databases 30 (e.g., blockchains) can be used to store S4, S5, S9, S12 outcomes of the verification process, the QC process, as well as the measurements values obtained from the sensors 10, and/or the output values 27 obtained with the computerized process 25. This makes it possible to track the genuineness of the various actors involved (the sensors 10 and the processor 21, possibly the smartphone too), as well as the methodology used for the quality control assessment. One can for example store S12 an outcome of the comparison S11 of the output values 27 with corresponding reference values and/or a value indicative of the quality assessment (e.g., a mere flag indicating whether the quality is satisfactory, or not), see FIG. 2. Similarly, an outcome of the verification processes S2, S5 can be stored on the database 30, indicating a status of the devices involved, e.g., whether such devices have been duly verified or not. Again, results of the verifications can be stored even if the verifications fail, to track fraudulent attempts to obtain quality certificates.

At present, the sensors 10 and values produced by such sensors are discussed in detail. As mentioned earlier, the measurements values can possibly pertain to a single property, sensed at different times by a single sensor. However, in some embodiments, the measurements values can possibly concern distinct properties, e.g., chemical or physical properties relating to the item or the technical process of interest, as sensed by several sensors 10. For example, FIG. 1 assumes three distinct types of sensors 11-13, each interfaced with an edge device 21. In this particular example, the set of sensors 10 includes a temperature sensor 11, a pressure sensor 12, and a multi-sensor array 13.

In some embodiments, a single, yet multifunction sensor 13 can be involved, e.g., a cross-sensitive multi-sensor array. For example, the sensor 13 can be embodied as a portable sensor, including a probe and a housing. In this example, the probe can comprise a sensing part with several sensing elements. The housing can be designed to maintain the probe so as for its sensing part to protrude from an external surface of the housing and thereby extend outside the housing. That is, this sensor can be designed so as to define an open-ended gap between the housing and a lateral surface of the sensing part of the probe, such that the portable sensor can be placed on a liquid container, such as a drinking glass or a beaker, so as to slot onto the rim of the container. Such a sensor 13 is particularly practical to perform measurements in the field, in a liquid. The sensing elements of the probe may notably comprise multiple electrodes, as seen in FIG. 1, so as to provide a multiple array of sensing elements. Such electrodes can, for instance, be plated or printed on a base surface of the probe. This way, multiple measurements can be concurrently performed, which can possibly relate to distinct properties of a sample. Note, however, that measurement values produced by a cross-sensitive, multi-sensor array 13 can possibly relate, in part, to a same property of the sample. For example, in an electrochemical, multi-sensor array, one sensor element can be sensitive to $Cl^-$, while another sensor element can be sensitive to both $Cl^-$ and $SO_4^{2-}$. In this case, the measurement values do not relate to fully distinct properties of the sample.

More generally, several types of sensors can be used, e.g., chemical sensors (for measuring pH, ion concentrations, etc.), physical sensors (for measuring pressure, mass, density, etc.), optical sensors (for measuring color, opacity, etc.), and acoustic sensors (for measuring frequency, amplitude, etc.), to name a few.

The following describes examples of processing performed S8 according to said computerized process 25, in order to produce the output values 27, on which the QC process is based.

In embodiments, the number of output values 27 is strictly less than the number of measurements values obtained from the sensors 10 (this number is nevertheless larger than or equal to 1). That is, the process 25 or the underlying mathematical function can be designed so as for the number of output values to be strictly less than the number of measurements values taken as inputs (or arguments). This makes the output values 27 less interpretable by a human and thus more difficult to fake. Incidentally, the output values can otherwise be mapped to long sequences of numbers.

The computerized process 25 may notably include a feature extraction algorithm, as used in cognitive pipelines. In this case, the output values 27 typically come in the form of feature vectors. Note, this extraction can possibly precede a dimensionality reduction step, following the extraction. In either case, the output values 27 will typically not be human-readable or interpretable. Such output values can, however, readily be used to perform a classification (e.g., at an external entity 23) with a trained classifier, which, in turn, makes it easy to conclude as to the quality of the item or technical process.

In some embodiments, the computerized process 25 can involve other mathematical functions. For example, the process 25 can be designed to extract particular numeric properties from the measurements S3, S7, i.e., features that describe the largest variance between comparable objects 1, in order to support the QC application. In particular, this mathematical function can be based on a principal component analysis (PCA) method. In that case, the output values 27 can comprise values computed as principal components according to said PCA. In that respect, the process 25 can possibly comprise computing one or more of the output values 27 according to the factor loadings established from PCA conducted on a training data set comprising genuine items. Accordingly, the comparison performed at step S11 can involve computing the differences between the computed output values 27 and the principle component scores of the training data set.

Various other computerized processes 25, algorithms, and/or mathematical functions can be relied on. For example, meta parameters of an algorithm can be used as output values, which again are hard to tamper with without knowing the algorithm (which is typically not easily reversable). In all cases, the underlying mathematical function may not linearly depend on the measurements values that it takes as input (as arguments), to make it harder to fake. In some embodiments, however, this function can be a linear combination of several arguments (corresponding to some or all of said measurement values). Still, the computerized process 25 can further select only a subset of the output values 27 obtained from the sensors 10, based on which the comparisons S11 are subsequently performed. In some embodiments, several permutations of the measurement values can be considered for input to the process 25, to generate several sets of output values, etc.

Referring back to FIG. 1, another aspect of the present disclosure is now described, which concerns a computerized system 20. Functional aspects of such a system have already been described in reference to the present methods. The system 20 is thus only succinctly described in the following. Namely, the system 20 comprises an interface 21 to connect to the sensors 10, so as to be in data communication therewith. In addition, the system includes storage devices 21-23, which stores instructions, as well as processor 21-23, which are generally configured to execute said instructions. This notably causes to verify the sensors 10 (and possibly the processor 21, and/or other peripheral devices 22 too) as part of a verification process and assess a quality of an item 1 or a technical process 1 as part of a QC process, according to method steps described earlier in reference to FIGS. 2-4.

As said, the system 20 may notably comprise one or more peripheral devices 21, 22, i.e., local devices (close to the sensors). Remote processor 23 can form part of the system 20 too, as assumed in FIG. 1. The peripheral devices 21, 22 may notably include a smartphone and/or an optical reader (to scan physical fingerprints of the sensors 10). The peripheral devices 21, 22, for instance, can include local processor 21, e.g., a microcontroller, locally interacting with the sensors 10. The peripheral devices 21, 22 may notably be leveraged to execute the computerized process 25, and involved to verify or authenticate the devices 10, 21. The remote entity 23 may notably be a back-end server 23 (e.g., including a gateway), as assumed in FIG. 1. Note, the system 20 can possibly include one or more external databases 30 too. In all cases, the processing resources of the entities 21-23, 30, can interact in view of performing steps according to the present methods.

Figure 5:
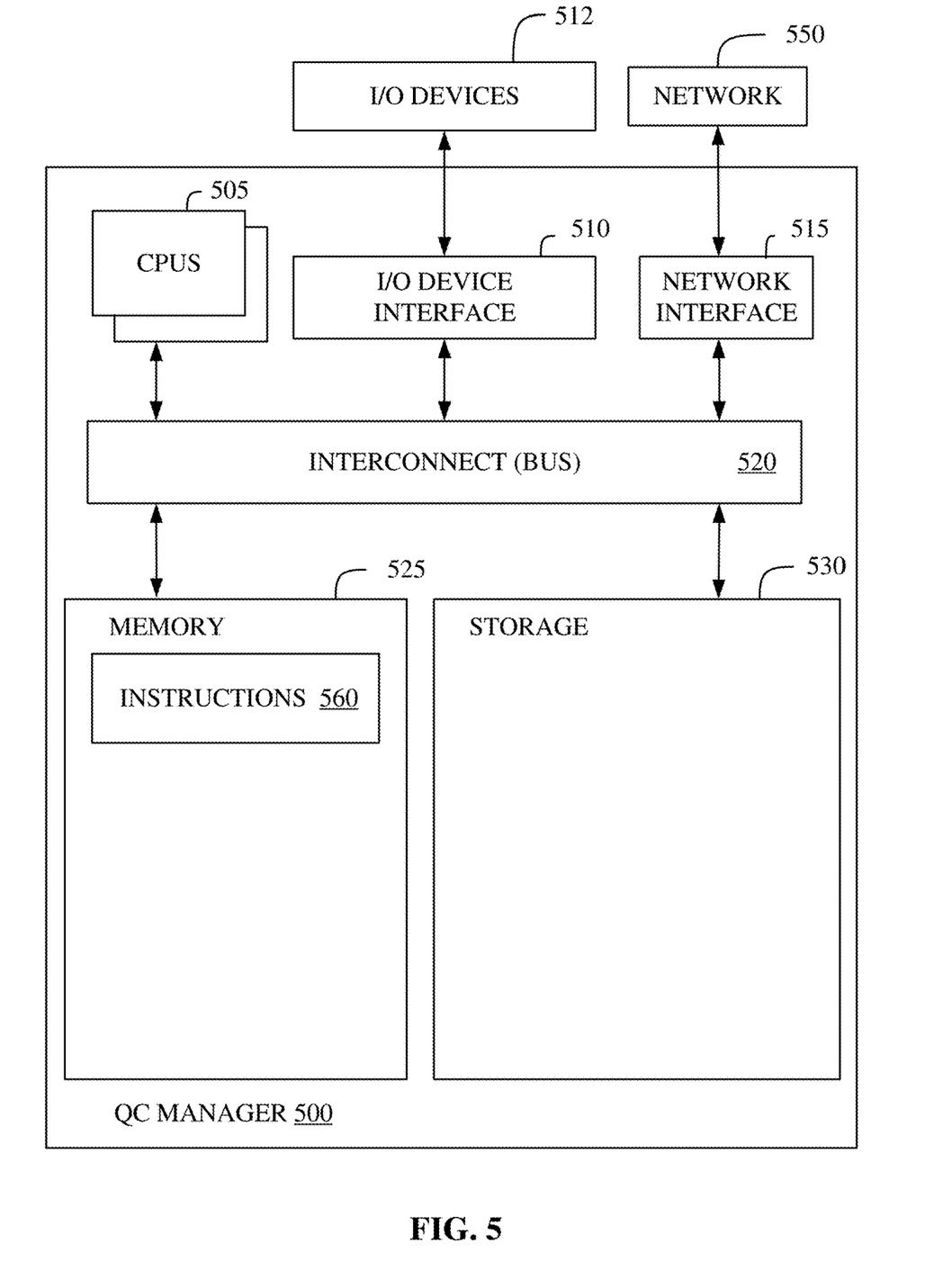
FIG. 5 is a block diagram of an example quality control manager, in accordance with some embodiments of the present disclosure.

FIG. 5 is a block diagram of an example quality control manager 500, in accordance with some embodiments of the present disclosure. In various embodiments, the quality control manager 500 is similar to the computerized system 20 and can perform the functionality discussed in FIGS. 1-4. In some embodiments, the quality control manager 500 provides instructions for the aforementioned methods and/or functionalities to a client machine such that the client machine executes the method, or a portion of the method, based on the instructions provided by the quality control manager 500. In some embodiments, the quality control manager 500 comprises software executing on hardware incorporated into a plurality of devices.

The quality control manager 500 includes a memory 525, storage 530, an interconnect (e.g., BUS) 520, one or more CPUs 505 (also referred to as processors 505 herein), an I/O device interface 510, I/O devices 512, and a network interface 515.

Each CPU 505 retrieves and executes programming instructions stored in the memory 525 or the storage 530. The interconnect 520 is used to move data, such as programming instructions, between the CPUs 505, I/O device interface 510, storage 530, network interface 515, and memory 525. The interconnect 520 can be implemented using one or more busses. The CPUs 505 can be a single CPU, multiple CPUs, or a single CPU having multiple processing cores in various embodiments. In some embodiments, a CPU 505 can be a digital signal processor (DSP). In some embodiments, CPU 505 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (POP) CPU configurations). Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, and/or flash memory devices. Additionally, the storage 530 can include storage area-network (SAN) devices, the cloud, or other devices connected to the quality control manager 500 via the I/O device interface 510 or to a network 550 via the network interface 515.

In some embodiments, the memory 525 stores instructions 560. However, in various embodiments, the instructions 560 are stored partially in memory 525 and partially in storage 530, or they are stored entirely in memory 525 or entirely in storage 530, or they are accessed over a network 550 via the network interface 515.

Instructions 560 can be processor-executable instructions for performing any portion of, or all, any of the functionality discussed in FIGS. 1-4.

In various embodiments, the I/O devices 512 include an interface capable of presenting information and receiving input. For example, I/O devices 512 can present information to a listener interacting with quality control manager 500 and receive input from the listener.

The quality control manager 500 is connected to the network 550 via the network interface 515. Network 550 can comprise a physical, wireless, cellular, or different network.

In some embodiments, the quality control manager 500 can be a multi-user mainframe computer system, a single-user system, or a server computer or similar device that has little or no direct user interface but receives requests from other computer systems (clients). Further, in some embodiments, the quality control manager 500 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary quality control manager 500. In some embodiments, however, individual components can have greater or lesser complexity than as represented in FIG. 5, components other than or in addition to those shown in FIG. 5 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
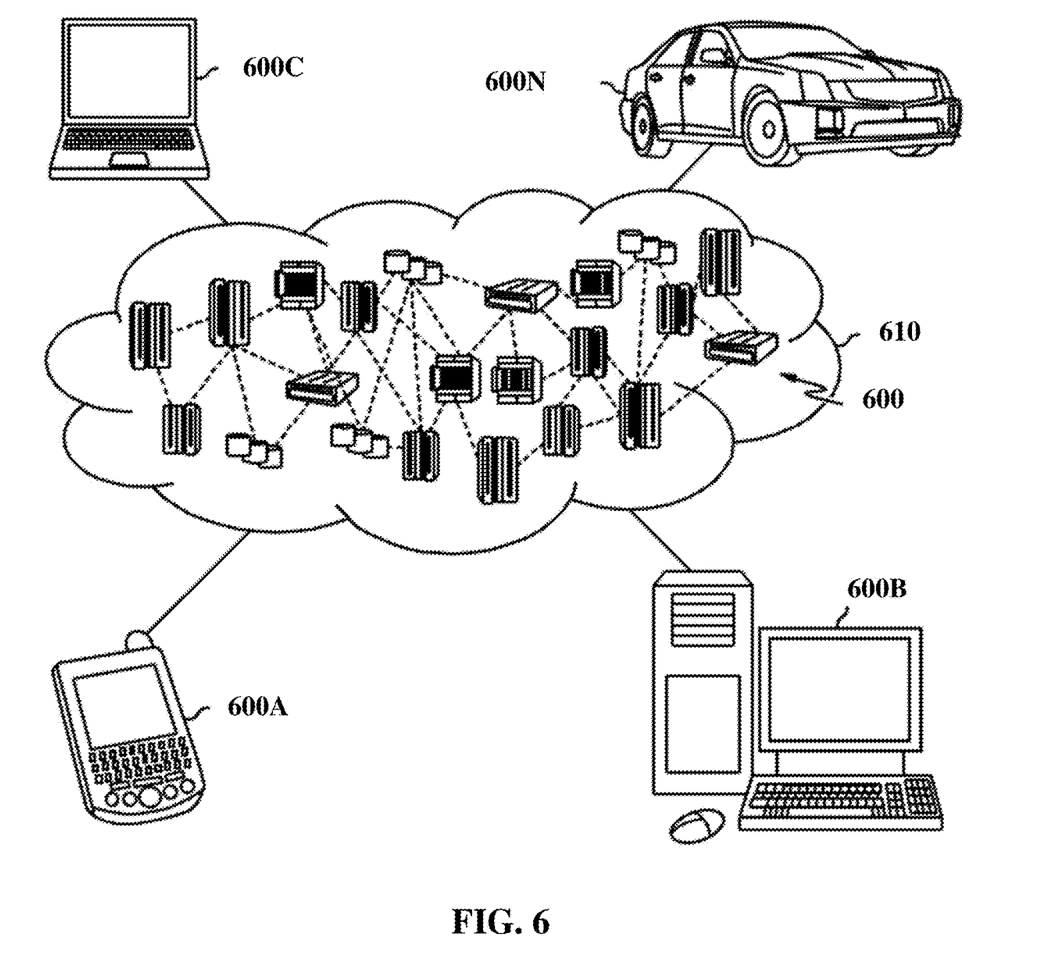
FIG. 6 is a cloud computing environment, according to some embodiments of the present disclosure.

FIG. 6 is a cloud computing environment 610, according to some embodiments of the present disclosure. As shown, cloud computing environment 610 includes one or more cloud computing nodes 600. The cloud computing nodes 600 can perform the functionality discussed in FIGS. 1-4. Additionally, cloud computing nodes 600 can communicate with local computing devices used by cloud consumers, such as, for example, personal digital assistant (PDA) or cellular telephone 600A, desktop computer 600B, laptop computer 600C, and/or automobile computer system 600N. Further, the cloud computing nodes 600 can communicate with one another. The cloud computing nodes 600 can also be grouped (not shown) physically or virtually, in one or more networks, such as Private, Community, Public, or Hybrid clouds as described hereinabove, or a combination thereof. This allows cloud computing environment 610 to offer infrastructure, platforms and/or software as services for which a cloud consumer does not need to maintain resources on a local computing device. It is understood that the types of computing devices 600A-N shown in FIG. 6 are intended to be illustrative only and that computing nodes 600 and cloud computing environment 610 can communicate with any type of computerized device over any type of network and/or network addressable connection (e.g., using a web browser).

Figure 7:
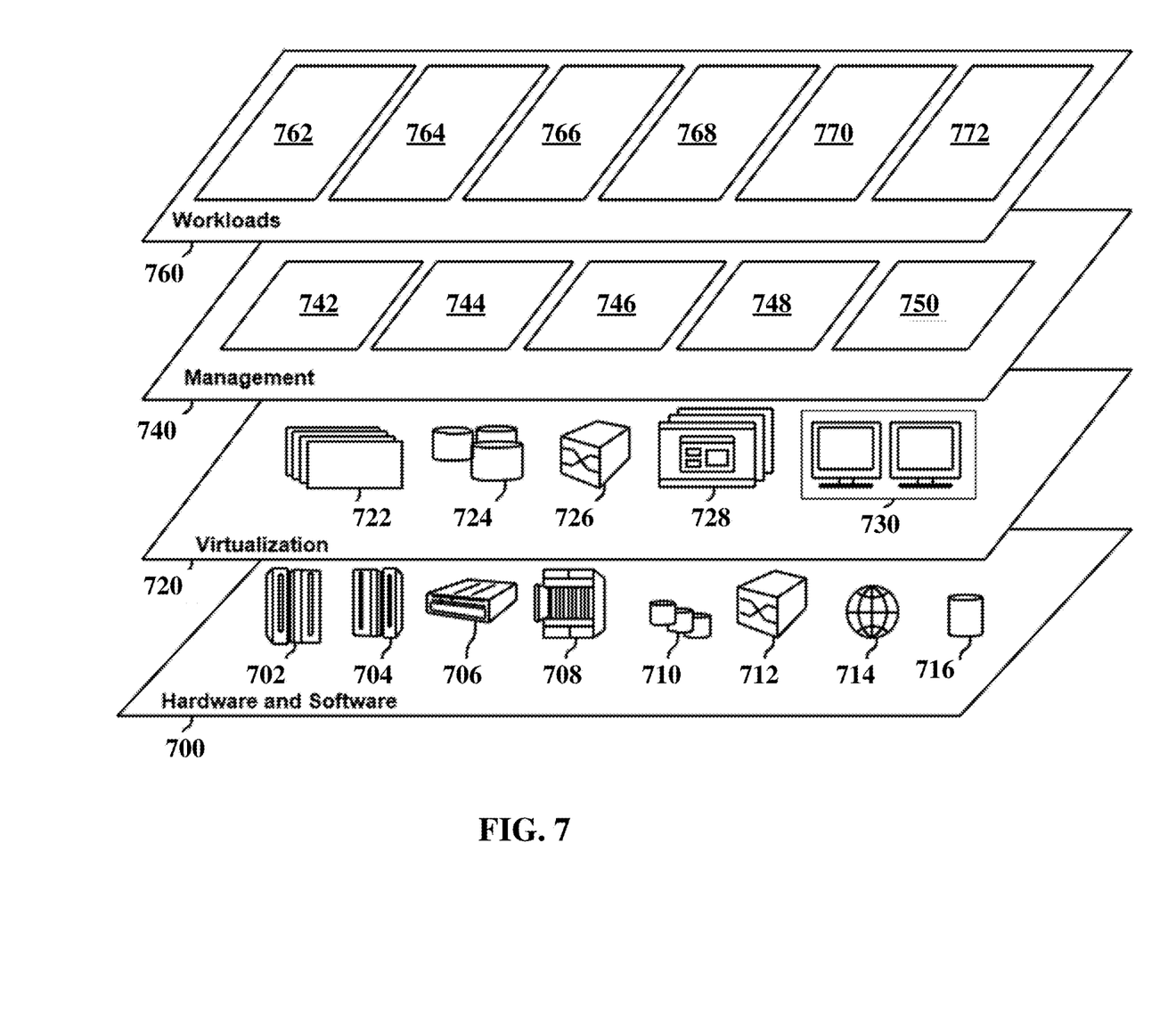
FIG. 7 is a set of functional abstraction model layers provided by cloud computing environment, according to some embodiments of the present disclosure, is shown.

FIG. 7 is a set of functional abstraction model layers provided by cloud computing environment 610 (FIG. 6), according to some embodiments of the present disclosure. It should be understood in advance that the components, layers, and functions shown in FIG. 7 are intended to be illustrative only and embodiments of the disclosure are not limited thereto. As depicted below, the following layers and corresponding functions are provided.

Hardware and software layer 700 includes hardware and software components. Examples of hardware components include: mainframes 702; RISC (Reduced Instruction Set Computer) architecture based servers 704; servers 706; blade servers 708; storage devices 710; and networks and networking components 712. In some embodiments, software components include network application server software 714 and database software 716.

Virtualization layer 720 provides an abstraction layer from which the following examples of virtual entities can be provided: virtual servers 722; virtual storage 724; virtual networks 726, including virtual private networks; virtual applications and operating systems 728; and virtual clients 730.

In one example, management layer 740 can provide the functions described below. Resource provisioning 742 provides dynamic procurement of computing resources and other resources that are utilized to perform tasks within the cloud computing environment. Metering and Pricing 744 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 746 provides access to the cloud computing environment for consumers and system administrators. Service level management 748 provides cloud computing resource allocation and management such that service levels are met. Service level management 748 can allocate suitable processing power and memory to process static sensor data. Service Level Agreement (SLA) planning and fulfillment 750 provide pre-arrangement for, and procurement of, cloud computing resources for which a future requirement is anticipated in accordance with an SLA.

Workloads layer 760 provides examples of functionality for which the cloud computing environment can be utilized. Examples of workloads and functions which can be provided from this layer include: mapping and navigation 762; software development and lifecycle management 764; virtual classroom education delivery 766; data analytics processing 768; transaction processing 770; and quality control manager 772.

The present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented, quality control method, wherein the method comprises:
   verifying one or more sensors as part of a verification process and assessing a quality of an item or a technical process as part of a quality control process by:

obtaining two or more measurements values characterizing the item or the technical process from the one or more sensors;

obtaining one or more output values based on a computerized process taking the two or more measurements values as inputs, wherein the computerized process decouples the output values from the measurements values using at least one algorithm that does not linearly depend on the measurement values to obtain the output values that are not human-interpretable;

comparing at least one of the output values obtained to one or more corresponding reference values, to obtain a quality assessment of the item or the technical process; and providing the one or more output values for storage in a distributed ledger of a blockchain.

2. The method according to claim 1, wherein the one or more output values are instructed to be obtained via a given processor and the method further comprises verifying the given processor.

3. The method according to claim 2, wherein the method further comprises connecting to a computerized entity to verify each of the one or more sensors and the given processor, based on attributes of the given processor.

4. The method according to claim 3, wherein the method further comprises enrolling each of the one or more sensors and the processor at the computerized entity, prior to verifying the one or more sensors and the processor.

5. The method according to claim 3, wherein verifying the one or more sensors and the given processor comprises communicating identifiers of the one or more sensors and the given processor for the computerized entity to compare the communicated identifiers to reference identifiers.

6. The method according to claim 1, wherein the method further comprises enrolling each of the one or more sensors with a computerized entity by communicating one or more public keys and/or one or more certificates associated to the one or more sensors to the computerized entity.

7. The method according to claim 6, wherein verifying the one or more sensors comprises communicating signed versions of the two or more measurements values obtained from the one or more sensors to the computerized entity, where the signed versions have been obtained by signing the two or more measurements values using one or more private keys associated to the one or more sensors, for the computerized entity to verify the signed versions based on the one or more public keys or on one or more public keys derived from the one or more certificates.

8. The method according to claim 3, wherein the method further comprises verifying one or each of the given processor and the one or more of the sensors by interacting with the computerized entity to authenticate the one or each of the given processor and the one or more of the sensors, based on attributes of the sensors.

9. The method according to claim 3, wherein comparing the output values comprises querying the computerized entity based on the output values, for the computerized entity to compare the output values with the corresponding reference values and compute a value indicative of the quality assessment.

10. The method according to claim 1, wherein the method further comprises instructing to store on an external database one or more verification values corresponding to one or more selected from a group consisting of:

an outcome of one or each of the verification process and the quality control process;

the two or more measurements values; and the one or more output values.

11. The method according to claim 10, wherein the external database is a computerized, distributed ledger.

12. The method according to claim 10, wherein the method further comprises connecting to a computerized entity for it to verify the one or more sensors and store the one or more verification values on the external database.

13. The method according to claim 12, wherein the method further comprises, at the computerized entity, signing data representative of the one or more verification values to be stored on the external database, using a private key of the computerized entity, and at the external database, verifying a signature of the computerized entity, prior to storing the one or more values.

14. The method according to claim 1, wherein the two or more measurements values obtained comprise at least two measurements values relating to distinct properties as sensed by the one or more sensors.

15. The method according to claim 1, wherein:

said one or more sensors comprises one or each of a multifunction sensor and at least two sensors; and said two or more measurements values are obtained from every sensor of the one or more sensors.

16. The method according to claim 1, wherein a number of output values is larger than or equal to 1 and less than a number of measurements values.

17. The method according to claim 1, wherein the computerized process includes a feature extraction function, whereby the output values comprise a feature vector.

18. The method according to claim 1, wherein the computerized process comprises selecting a subset of the output values, whereby the subset of the output values are compared to the reference values, to obtain the quality assessment of the item or the technical process.

19. A computerized system comprising:

an interface to connect to one or more sensors in data communication;

a storage device storing instructions; and a processor configured to execute the instructions, to cause to verify the one or more sensors as part of a verification process and assess a quality of the item or a technical process as part of a quality control process by:

obtaining two or more measurements values characterizing the item or the technical process from the one or more sensors;

obtaining one or more output values based on a computerized process taking the two or more measurements values as inputs, wherein the computerized process decouples the output values from the measurements values using at least one algorithm that does not linearly depend on the measurement values to obtain the output values that are not human-interpretable;

comparing at least one of the output values obtained to one or more corresponding reference values, to obtain a quality assessment of the item or the technical process; and providing the one or more output values for storage in a distributed ledger of a blockchain.

20. A computer program product for performing quality control, the computer program product comprising a computer readable storage medium having program instructions embodied therewith, wherein the program instructions are executable by one or more processors of a computerized system to cause the computerized system to verify one or more sensors as part of a verification process and assess a quality of an item or a technical process as part of a quality control process by:

obtaining two or more measurements values characterizing the item or the technical process from the one or more sensors;

obtaining one or more output values based on a computerized process taking the two or more measurements values as inputs, wherein the computerized process decouples the output values from the measurements values using at least one algorithm that does not linearly depend on the measurement values to obtain the output values that are not human-interpretable;

comparing at least one of the output values obtained to one or more corresponding reference values, to obtain a quality assessment of the item or the technical process; and     providing the one or more output values for storage in a distributed ledger of a blockchain.

* * * * *